April 29, 1930.     C. R. SHORT     1,756,914
BRAKE
Filed April 5, 1924     4 Sheets-Sheet 1

Inventor
CHARLES R. SHORT
By Blackmore, Spencer & Flink,
His Attorneys

April 29, 1930.  C. R. SHORT  1,756,914
BRAKE
Filed April 5, 1924  4 Sheets-Sheet 2

Inventor
CHARLES R. SHORT
By Blackmore, Spencer & Hulse
His Attorneys

Inventor
CHARLES R. SHORT
His Attorneys

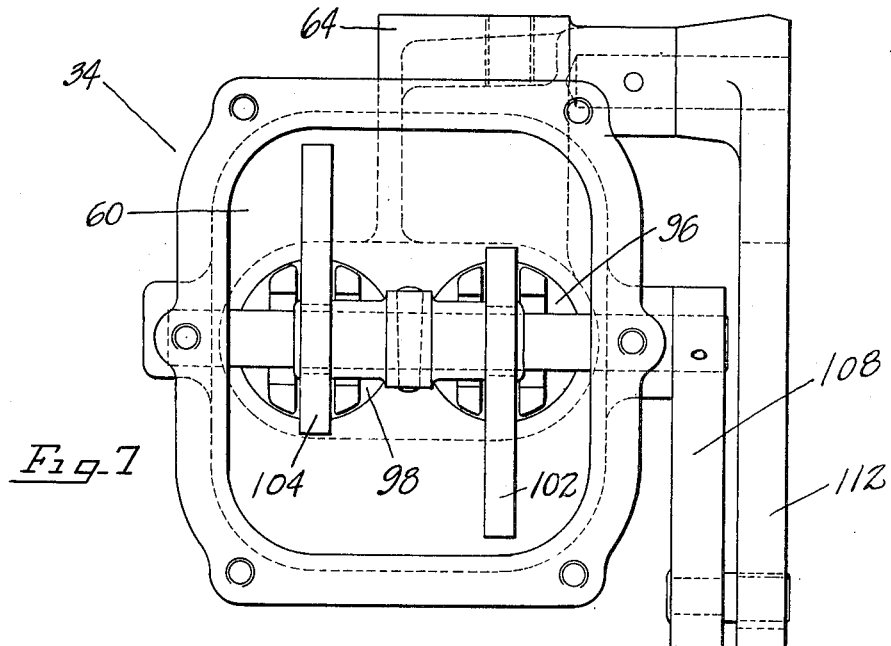
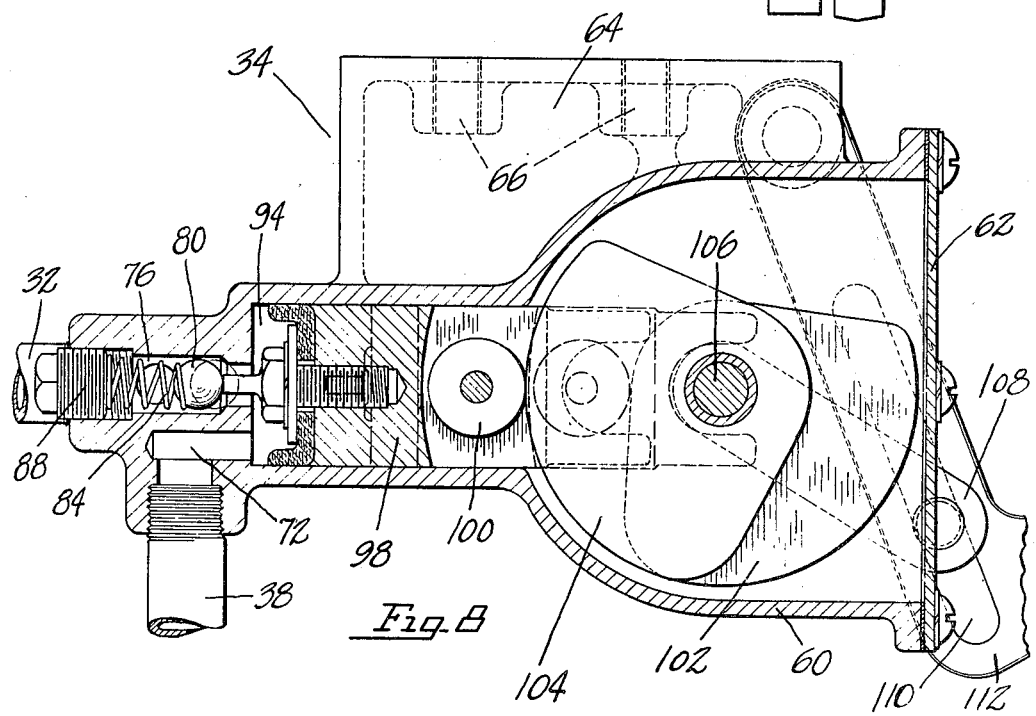

Registered Apr. 29, 1930

1,756,914

UNITED STATES PATENT OFFICE

CHARLES R. SHORT, OF DAYTON, OHIO, ASSIGNOR TO GENERAL MOTORS CORPORATION, OF DETROIT, MICHIGAN, A CORPORATION OF DELAWARE

BRAKE

Application filed April 5, 1924. Serial No. 704,419.

This invention relates to vehicles, and is illustrated as embodied in an automobile chassis having hydraulic brakes on the front dirigible wheels arranged to be controlled by the steering of the vehicle in such a manner that the pressure on the outer brake is automatically relieved in rounding a corner, to avoid any possibility of locking both front wheels just when their directing force is most needed.

An object of the invention is to provide a compact arrangement of the brake-operating connections, by providing a single unitary device, shown as a novel duplex valve mechanism, for controlling differently both the front brakes, so that the pressure on the two brakes is differentiated when the wheels are swiveled in turning, preferably in such a manner that the outer brake is released without affecting the inner brake. In one desirable embodiment of the invention, a single fluid-supply conduit is connected to the two brake conduits through the duplex valve mechanism.

Another feature of the invention relates to the differentiation of the pressure on the brakes, in rounding a corner, by means (which may, in the case of fluid-operated brakes, include a duplex valve mechanism such as described above) connected directly to the usual bottom rockshaft of the steering column assembly, or in some other manner directly operated by the steering column.

The above and other objects and features of the invention, including in one aspect of the invention any arrangement permitting the desired differentiation of the pressures on hydraulic brakes receiving pressure from a driver or pedal operated piston in a central master cylinder, and various other novel combinations and desirable particular constructions, will be apparent from the following description of two illustrative embodiments shown in the accompanying drawings, in which:

Figure 7 is a rear elevation of the duplex valve mechanism, with the end plate of the casing removed; and Figure 8 is a vertical section through the duplex valve mechanism on the line 8—8 of Figure 5.

Figure 1:
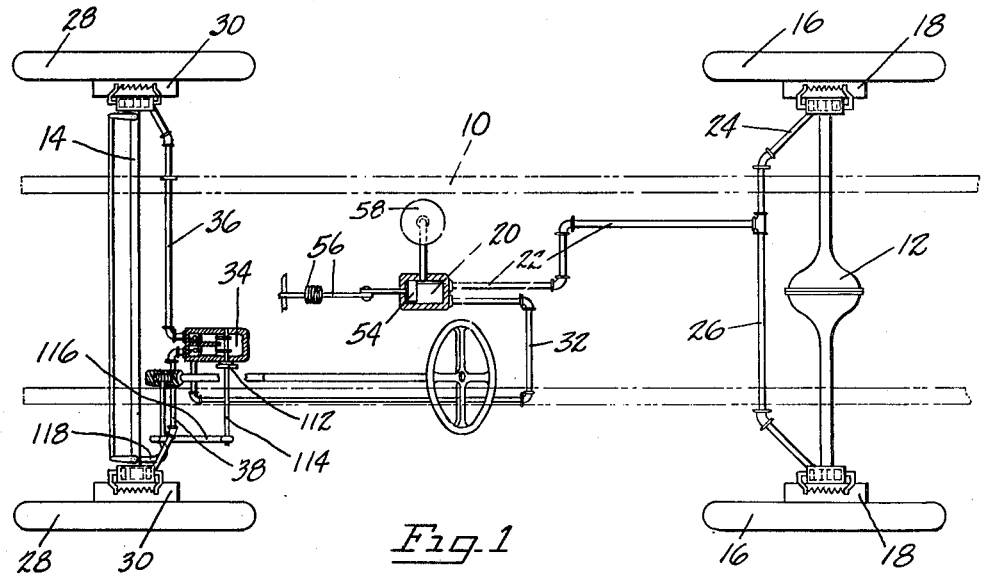
Figure 1 is a diagrammatic top plan view of a first modification embodied in an automobile chassis, and with the front wheels in normal straight-ahead position.

In both modifications, the drawings show the invention embodied in an automobile chassis comprising a frame 10 supported by the usual springs on a rear axle 12 and a front axle 14. The rear wheels 16 have hydraulic brakes 18 operated by liquid forced under pressure from a central master cylinder 20 through conduits 22, 24, and 26; and the front dirigible wheels 28 have hydraulic brakes 30 operated by liquid forced under pressure from the central master cylinder 20 through a conduit 32 to a novel duplex valve mechanism 34 and thence through conduits 36 and 38.

Figure 4:
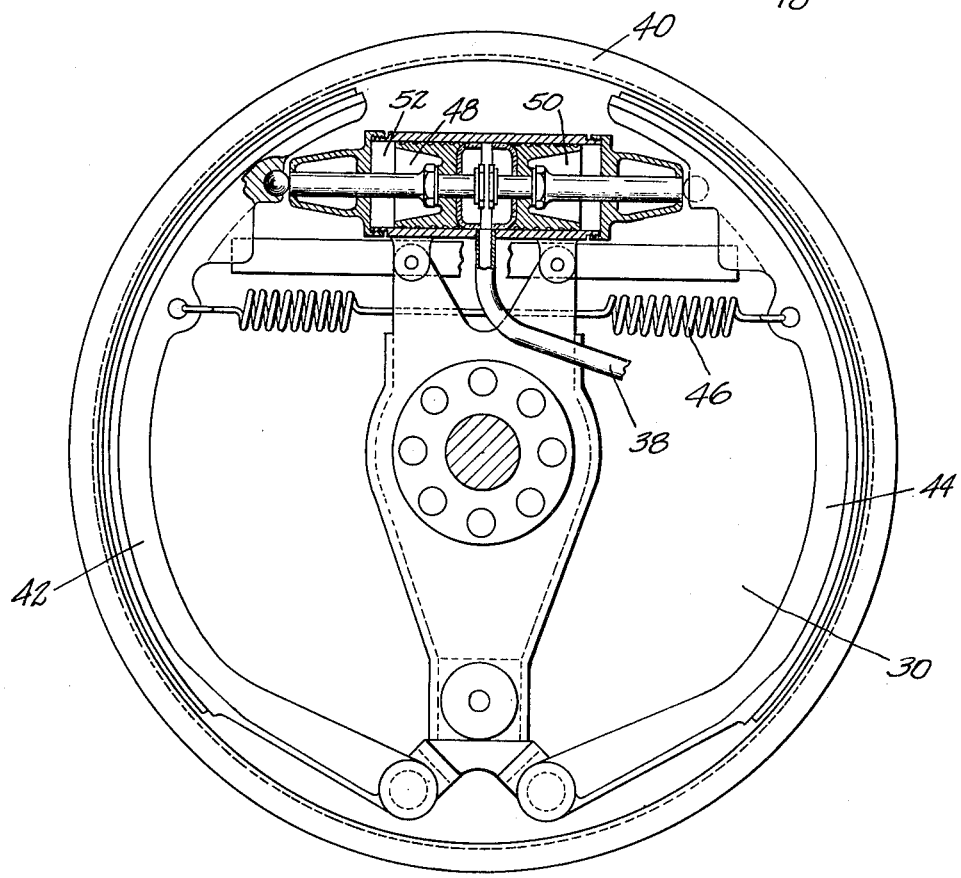
Figure 4 is a view, partly in side elevation and partly in vertical section, of one of the brakes.
Figure 5:
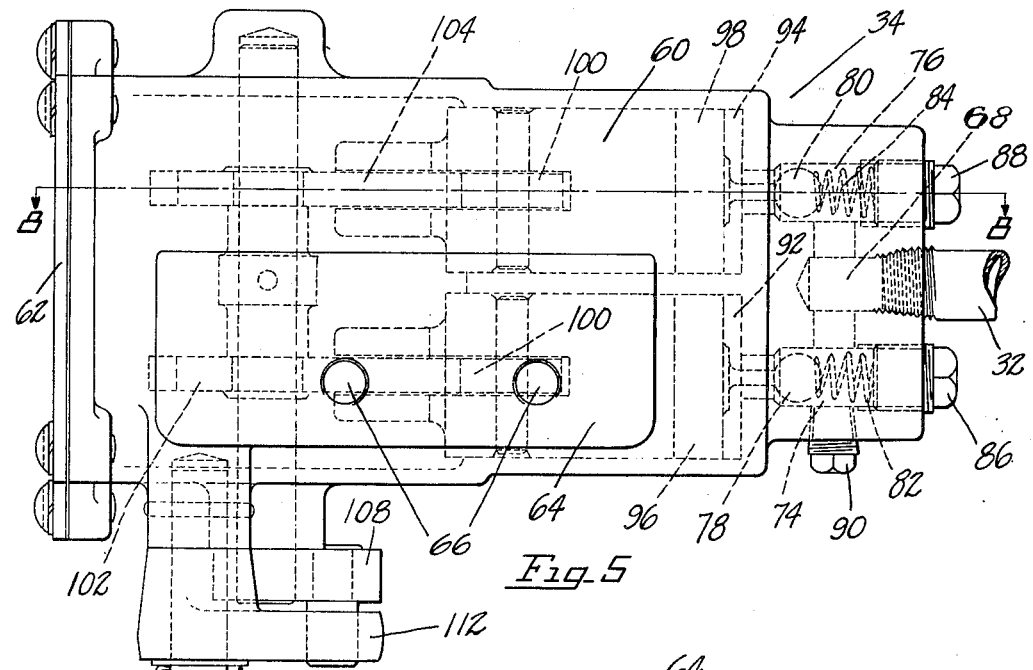
Figure 5 is a top plan view of the duplex valve mechanism.

One of the brakes is shown in Figure 4, and as there shown comprises a drum 40 carried by the wheel, and a pair of shoes 42 and 44 pivotally connected to a support on the rear axle or on the front wheel knuckles as the case may be. The shoes are urged toward idle position by a return spring 46, and are hydraulically operated to apply the brakes bp pistons 48 and 50 in a cylinder 52 connected at a central joint to the corresponding conduit, e. g. conduit 38.

Preferably pressure is applied to the liquid in the conduit by a piston 54 connected to a brake pedal 56. The conduits are kept full of liquid by a reserve reservoir 58, in the usual manner. The liquid may be oil, or a mixture of alcohol and glycerine, or a mixture of alcohol and castor oil, or other suitable non-freezing liquid. Most of the features of the invention are applicable to air and vacuum brakes, as well as hydraulic brakes, however, and certain features are applicable to other than fluid brakes.

One of the important features relates to the novel duplex valve 34 mechanism shown in detail in Figures 5–8. This mechanism is housed in a casing 60, having a removable end plate 62, and having a supporting web 64 formed with openings 66 for bolts attaching the casing to the chassis frame 10. The casing is provided at its front end with a centrally-located intake port 68 receiving the end of supply conduit 32 from the master cylinder 20, and with two outlet ports 70 and 72 communicating with the brake conduits 36 and 38. The intake port, as best shown in dotted lines in Figure 5, has two branches 74 and 76, arranged to be obstructed or shut off at times by ball check valves 78 and 80 held by springs 82 and 84, held by threaded plugs 86 and 88 closing the ends of the passages. The cross connection between the two branches 74 and 76, and the intake port 68, is also closed by a threaded plug 90. Branches 74 and 76 are connected, when the check valves are open, with outlet ports 70 and 72, by valve cylinders 92 and 94 respectively, thus permitting at such times free communication between the supply conduit 32 and the brake conduits 36 and 38.

The ball check valves 78 and 80 are controlled by fingers or bolts projecting from the ends of valve pistons or plungers 96 and 98, respectively. Each of these pistons is slotted at its rear end to receive an anti-friction roller 100 engaging one or the other of two oppositely-arranged or effective cams 102 and 104 secured to a rockshaft 106 operated by an arm 108.

Figure 6:
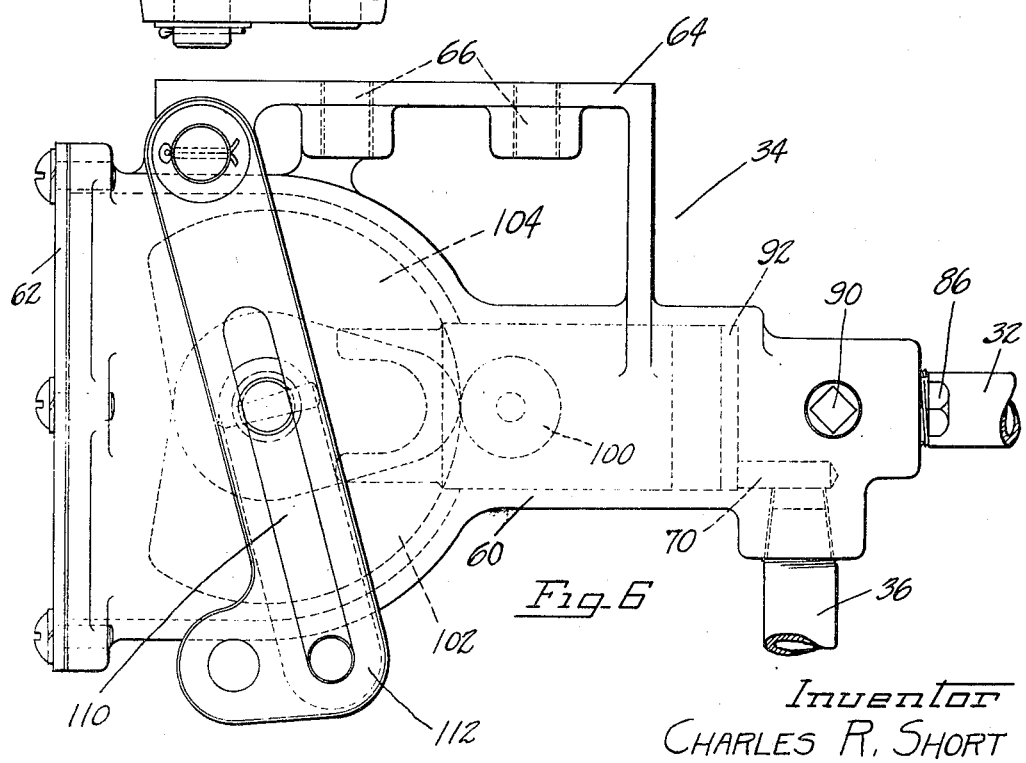
Figure 6 is a side elevation of the duplex valve mechanism.

It will be seen that when arm 108 is nearly vertical, as in Figure 6, both cams are effective, both check valves are held open against the resistance of their springs, and both brakes may be applied by depression of pedal 56. When arm 108 is rocked to the position shown in Figure 8, cam 104 remains effective, and the left front brake can be applied, or remains applied, according as the pedal is depressed after or before such movement of the arm. Cam 102, however, is no longer effective, ball check valve 78 is closed by its spring 82, thus obstructing or shutting off communication from supply conduit 32 to conduit 36 for the right front brake, and piston 96 is free to move back in cylinder 92 to allow relief of the pressure in conduit 36 if the brakes are at that time on. Thus the right front brake cannot be applied, or is released if already on. If arm 108 is again turned to the vertical position while the brakes are on, the movement of the piston 96 reestablishes the pressure on the right front brake. Obviously rocking arm 108 forward in Figure 8 would release, or prevent the application of, the left front brake in the same manner. Arm 108 has a roller engaging in a slot 110 in a longer lever arm 112, so that a comparatively small angular movement of lever arm 112 will produce a much greater angular movement of arm 108, with shaft 106 and the two cams.

Figure 2:
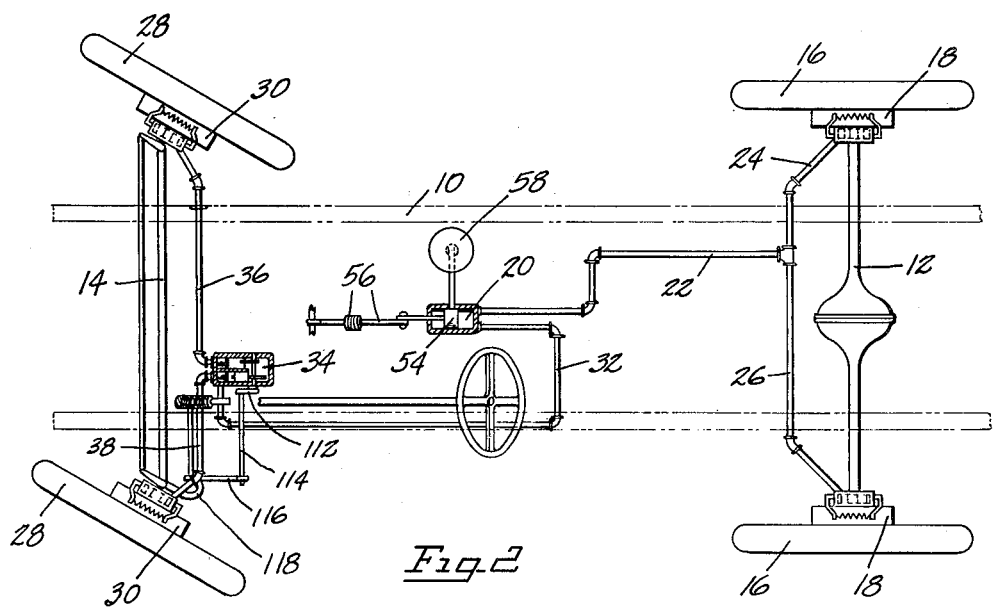
Figure 2 is a similar view showing the wheels swiveled to the right.
Figure 3:
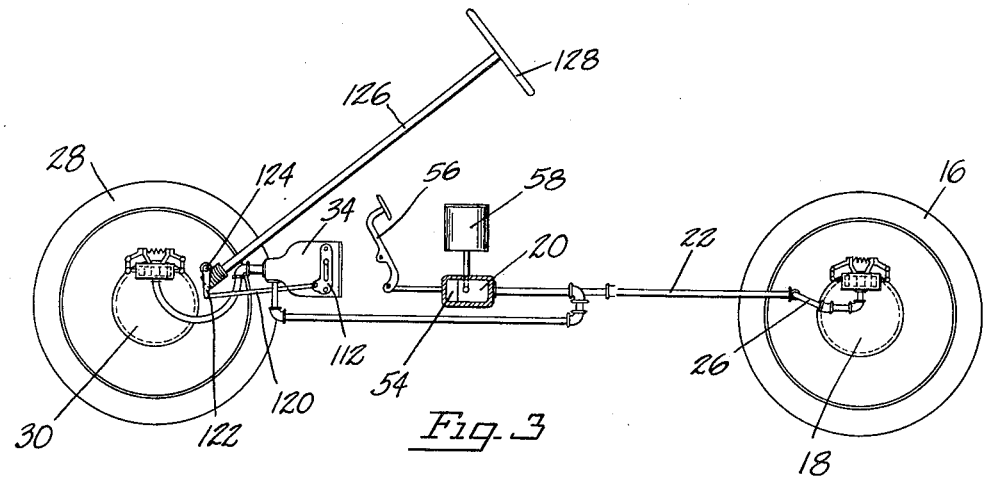
Figure 3 is a diagrammatic side elevation of an automobile chassis embodying a second modification.

In the modification shown in Figures 1 and 2, lever arm 112 carries a stem arm engaging a crank arm on a shaft 114, operated by a link 116 connected to a vertical crank on its outer end, and to the usual steering arm 118 of the left front wheel knuckle, and the lever arm 112 is therefore rocked by steering or swiveling movement of the front wheels to release whichever one of the brakes is on the outside of the turn. According to an important minor feature of the invention, and as illustrated in Figure 3, the above-described mechanism may be utilized as one convenient way of securing the release of the outer brake by connections direct from the steering column assembly. In the illustrated arrangement, lever arm 112 is connected by a link 120 to an arm 122 on the horizontal rockshaft 124, which is the usual rockshaft operating the front wheels, and which is operated by a steering column 126 having a hand steering wheel 128.

While two illustrative embodiments of the invention have been described in detail, it is not my intention to limit its scope to those particular embodiments, or otherwise than by the terms of the appended claims.

I claim:

1. In vehicle brake mechanism and in combination with a dirigible front wheel having a brake, a fluid operated device associated with said brake to apply it, and steering mechanism for moving said wheel to steer the vehicle; a conduit through which fluid under pressure is supplied to said fluid operated device to apply the brake; a normally open valve associated with said conduit and so arranged as to prevent flow therein toward said fluid operated brake applying device when the valve is closed; a cylinder arranged between said valve and said brake applying device and with the interior of which the conduit aforesaid is in permanently open communication; a piston operating in said cylinder; and means operated by the steering mechanism of the vehicle for permitting said valve to close and said piston to move outwardly in said cylinder when said front wheel is moved to a predetermined extent, to thereby increase the volume of said conduit.

2. In vehicle brake mechanism and in combination with a dirigible front wheel having a brake, a fluid operated device associated with said brake to apply it, and steering mechanism for moving said wheel to steer the vehicle; a conduit through which fluid under pressure is supplied to said fluid operated device to apply the brake; a normally open valve associated with said conduit and so arranged as to prevent flow therein toward said fluid operated brake applying device when the valve is closed; a cylinder arranged between said valve and said brake applying device and with the interior of which the conduit aforesaid is in permanently open communication; a piston operating in said cylinder; means carried by said piston and engaging said valve to hold it open when the piston is in its innermost position; means for holding said piston in its innermost position in said cylinder; and means operated by the steering mechanism of the vehicle for releasing the piston from said holding means when said front wheel is moved to a predetermined extent, so that the piston may move outwardly in said cylinder.

3. In vehicle brake mechanism and in combination with a dirigible front wheel having a brake, a fluid operated device associated with said brake to apply it, and steering mechanism for moving said wheel to steer the vehicle; a conduit through which fluid under pressure is supplied to said fluid operated device to apply the brake; a normally open valve associated with said conduit and so arranged as to prevent flow therein toward said fluid operated brake applying device when the valve is closed; a cylinder arranged between said valve and said brake applying device and with the interior of which the conduit aforesaid is in permanently open communication; a piston operating in said cylinder; means carried by said piston and engaging said valve to hold it open when the piston is in its innermost position; and means operated by the steering mechanism of the vehicle for normally holding said piston in its innermost position in said cylinder, and for releasing said piston so that it may move outward in said cylinder when said front wheel is moved to a predetermined extent.

4. In vehicle brake mechanism and in combination with a dirigible front wheel having a brake, a fluid operated device associated with said brake to apply it, and steering mechanism for moving said wheel to steer the vehicle; a conduit through which fluid under pressure is supplied to said fluid operated device to apply the brake; a normally open valve associated with said conduit and so arranged as to prevent flow therein toward said fluid operated brake applying device when the valve is closed; a cylinder arranged between said valve and said brake applying device and with the interior of which the conduit aforesaid is in permanently open communication; a piston operating in said cylinder; means carried by said piston and engaging said valve to hold it open when the piston is in its innermost position; an oscillating shaft operated by the steering mechanism of the vehicle; and a cam carried by said shaft and cooperating with said piston, the form of said cam being such that said piston is held in its innermost position when the front wheel is in a position for straight ahead movement of the vehicle, and is released so that it may move outwardly therein when the front wheel is moved from the position aforesaid to a predetermined extent.

5. In vehicle brake mechanism and in combination with a dirigible front wheel having a brake, a fluid operated device associated with said brake to apply it, and steering mechanism for moving said wheel to steer the vehicle; a conduit through which fluid under pressure is supplied to said fluid operated device to apply the brake; a normally open valve associated with said conduit and so arranged as to prevent flow therein toward said fluid operated brake applying device when the valve is closed; a cylinder arranged between said valve and said brake applying device and with the interior of which the conduit aforesaid is in permanently open communication; a piston operating in said cylinder; means carried by said piston and engaging said valve to hold it open when the piston is in its innermost position; an oscillating shaft; means carried by said shaft for holding said piston in its innermost position in the cylinder and for releasing said piston so that it may move outwardly therein; an arm carried by said shaft; a pivotally supported oscillating arm having a slot wherein a pin carried by said oscillating arm moves; and means whereby said pivotally supported oscillating arm is operated from the steering mechanism of the vehicle.

6. In brake mechanism for vehicles having dirigible front wheels, steering mechanism for operating the front wheels to steer the vehicle, non-dirigible rear wheels, fluid operated brake applying devices associated with the brakes at each of the four wheels, means for supplying fluid from a source of fluid under pressure to both rear wheel brake applying devices, and means including two separate conduits for supplying fluid under pressure from said source to each of the front wheel brake applying devices; normally open valves associated one with each of said conduits and so arranged as to prevent the flow of fluid toward the front wheel brake applying devices when the valves are closed; two cylinders associated one with each conduit and arranged between the valve therein and the brake applying device to which the conduit leads, and with the interiors of which cylinders the conduits are in permanently open communication; a piston operating in each cylinder; and means operated by the steering mechanism aforesaid for permitting the valve associated with the conduit leading to the wheel upon the outside of the curve when the vehicle deviates from straight ahead movement to close, and the piston associated with said conduit to move outwardly in its cylinder, when the front wheels are moved to a predetermined extent, to thereby increase the volume of said conduit.

7. In brake mechanism for vehicles having dirigible front wheels, steering mechanism for operating the front wheels to steer the vehicle, non-dirigible rear wheels, fluid operated brake applying devices associated with the brakes at each of the four wheels, means for supplying fluid from a source of fluid under pressure to both rear wheel brake applying devices, and means including two separate conduits for supplying fluid under pressure from said source to each of the front wheel brake applying devices; normally open valves associated one with each of said conduits and so arranged as to prevent the flow of fluid toward the front wheel brake applying devices when the valves are closed; two cylinders associated one with each conduit and arranged between the valve therein and the brake applying device to which the conduit leads, and with the interiors of which cylinders the conduits are in permanently open communication; a piston operating in each cylinder; means for holding said pistons in their innermost positions in their cylinders when the vehicle is moving in a straight ahead direction; means operated by the steering mechanism aforesaid for releasing the holding means associated with the piston of the conduit leading to the wheel upon the outside of the curve when the vehicle deviates from straight ahead movement to a predetermined extent, to thereby permit said piston to move outwardly in its cylinder; and means for causing the valve associated with the conduit aforesaid to close simultaneously with the outward movement of said piston.

In testimony whereof I affix my signature.

CHARLES R. SHORT.